(12) United States Patent
Imai (10) Patent No.: US 7,668,510 B2
(45) Date of Patent: Feb. 23, 2010

(54) TRANSMITTING/RECEIVING APPARATUS AND TRANSMITTING/RECEIVING METHOD

(75) Inventor: Tomohiro Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 454 days.

(21) Appl. No.: 10/587,166

(22) PCT Filed: Jan. 25, 2005

(86) PCT No.: PCT/JP2005/000926

§ 371 (c)(1),
(2), (4) Date: Jul. 26, 2006

(87) PCT Pub. No.: WO2005/074181

PCT Pub. Date: Aug. 11, 2005

(65) Prior Publication Data

US 2007/0159393 A1    Jul. 12, 2007

(30) Foreign Application Priority Data

Jan. 30, 2004    (JP)    ............................. 2004-024321

(51) Int. Cl.
*H04B 1/00* (2006.01)
(52) U.S. Cl. ...................... 455/63.4; 370/329; 370/334
(58) Field of Classification Search ................. 370/329, 370/334; 455/63.4
See application file for complete search history.

(56) References Cited

U.S. PATENT DOCUMENTS 5,642,353 A * 6/1997 Roy et al. .................... 370/329
5,828,658 A * 10/1998 Ottersten et al. ............ 370/310
6,188,913 B1 * 2/2001 Fukagawa et al. ......... 455/562.1
6,349,119 B1 * 2/2002 Sogabe et al. ............... 375/316
6,704,376 B2 * 3/2004 Mills et al. .................. 375/341
7,071,874 B2    7/2006 Doi (Continued)

FOREIGN PATENT DOCUMENTS

JP    2001505723    4/2001

(Continued)

OTHER PUBLICATIONS

PCT International Search Report dated May 17, 2005.

*Primary Examiner*—Lester Kincaid
*Assistant Examiner*—Isaak R Jama
(74) *Attorney, Agent, or Firm*—Dickinson Wright PLLC (57) ABSTRACT

A transmitting/receiving apparatus wherein a decision of performing SDM communication accompanied by a directivity control is correctly performed to improve the transmission efficiency. In the apparatus, a channel estimating part (205) performs channel estimation by use of known symbols included in a received signal. A channel variation deciding part (206) determines a correlation value between a channel estimation result of an immediately preceding process and that of a current process to determines the magnitude of a channel variation, and the determines, based on the magnitude of the channel variation, whether to perform SDM communication accompanied by a directivity control of perform SDM communication not accompanied by the directivity control. When a radio receiving part (107) receives a transmitting weight, a switching part (108) outputs the received transmitting weight to multipliers (103-1 to 103-n). When the receiving part (107) receives a signal an instruction of performing SDM communication not accompanied by the directivity control, the switching part (108) outputs, as the transmitting weight, "1" indicative of performing no directivity control, to the multipliers (103-1 to 103-n).

5 Claims, 9 Drawing Sheets

U.S. PATENT DOCUMENTS

| | | | |
|---|---|---|---|
| 7,363,057 B2 * | 4/2008 | Ishii et al. | 455/562.1 |
| 2002/0154705 A1 | 10/2002 | Walton et al. | |
| 2003/0103477 A1 | 6/2003 | Doi et al. | |
| 2003/0158330 A1 | 8/2003 | L'Alloret | |
| 2004/0022205 A1 * | 2/2004 | Miyata et al. | 370/319 |
| 2005/0129137 A1 * | 6/2005 | Yamada et al. | 375/267 |
| 2005/0148301 A1 | 7/2005 | Nagai et al. | |
| 2005/0157810 A1 | 7/2005 | Raleigh et al. | |
| 2005/0181831 A1 | 8/2005 | Doi | |

FOREIGN PATENT DOCUMENTS

| | | |
|---|---|---|
| JP | 2001285187 | 10/2001 |
| JP | 2003244045 | 8/2003 |
| JP | 2003258770 | 9/2003 |
| JP | 2003283359 | 10/2003 |
| JP | 2003283466 | 10/2003 |
| JP | 2003284128 | 10/2003 |
| JP | 2003530010 | 10/2003 |
| JP | 2004503181 | 1/2004 |
| JP | 2004531945 | 10/2004 |

* cited by examiner

PRIOR ART

TRANSMITTING/RECEIVING APPARATUS AND TRANSMITTING/RECEIVING METHOD

TECHNICAL FIELD

The present invention relates to a transmitting/receiving apparatus and transmitting/receiving method. More specifically, the present invention relates to a transmitting/receiving apparatus and transmitting/receiving method suitable for use for space division multiplexing communication schemes.

BACKGROUND ART

There are means for allowing large-capacity communication without expanding the frequency band, including MIMO (Multiple-Input Multiple-Output) techniques using a number of transmitting/receiving antennas (for example, see Patent Documents 1 and 2). With space division multiplexing (SDM) is, which is a MIMO technique, a number of antennas are provided in the transmitter and receiver, and the transmits independent signals different from one another from the antennas and spatially divides and the receiver receives a number of different signals simultaneously transmitted by directivity of a number of antenna array in receivers, thereby enabling communication capacity to be increased.

Figure 1:
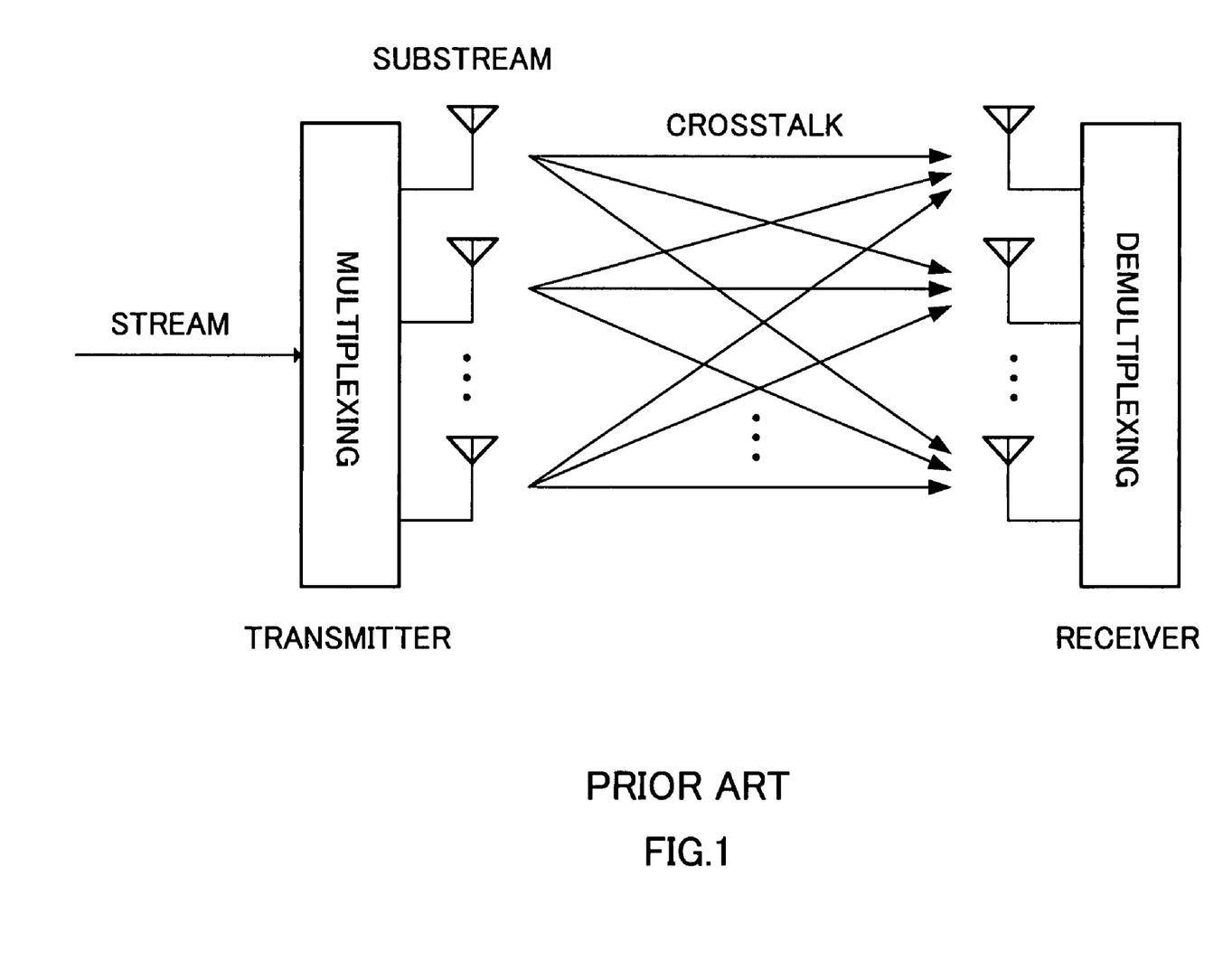
FIG. 1 is a diagram showing an example of SDM communication.

FIG. 1 is a diagram showing an example of SDM communication. As shown in FIG. 1, the transmitter transmits multiplexed data streams from a number of antennas (substreams), and the receiver receives radio signals transmitted by a number of paths (crosstalk) and divides the multiplexed signals.

In addition, if propagation channel information is known at the transmitter end, directivity control (transmission beam formation) is performed using a specific vector obtained by performing single value decomposition on a matrix which makes each channel response of propagation channels an element and forming a spatial orthogonal channel, thereby enabling much larger communication capacity than SDM to be obtained.

Figure 2:
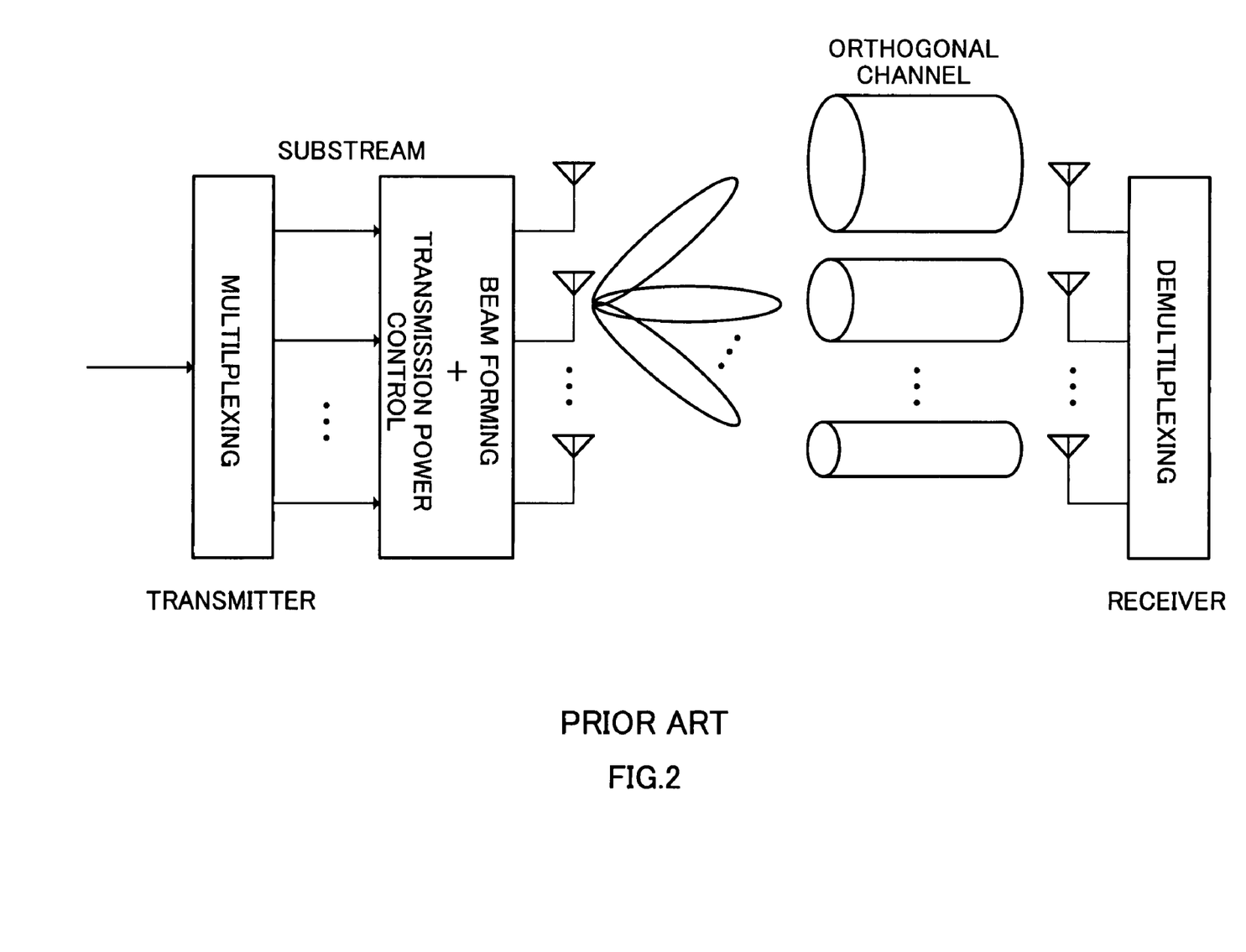
FIG. 2 is a diagram showing an example of SDM communication that performs directivity control at a transmitter end.

FIG. 2 is a diagram showing an example of SDM communication that performs directivity control at the transmitter end. As shown in FIG. 2, the transmitter performs processing of transmission power control and beam forming on signals transmitted from the antennas, and forms channels that are spatially orthogonal.

In SDM communication that performs directivity control at the transmitter end, methods for knowing channel information on the transmitting end may include providing feedback of a channel estimation result at a receiving end, or performing channel estimation at a transmitting end.

Figure 3:
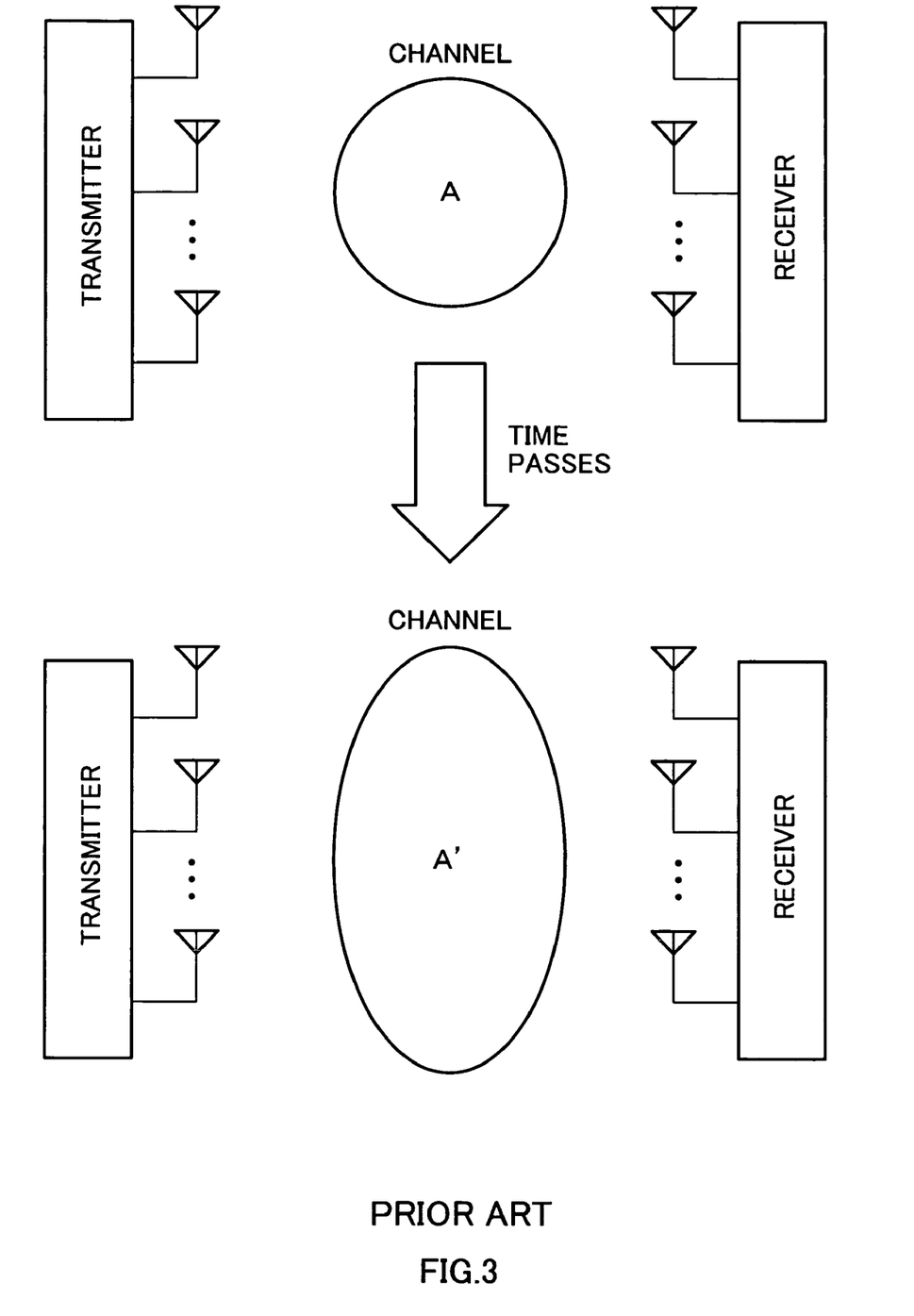
FIG. 3 is a diagram showing change in propagation path environment.

However, in the actual propagation environment, channels change at all times. FIG. 3 is a diagram showing change in propagation environment. As shown in FIG. 3, channel environment A at a given time changes to channel environment A' as time goes by.

When directivity control is performed using a result of channel estimation performed in environment A at the receiving end, if channel fluctuation is large—for example, if environment A differs from environment A' largely—it is not possible to form spatial orthogonal channel, and error rate characteristic when directivity control is performed at the transmitting end may be deteriorated than SDM when directivity control is not performed at the transmitting end.

Similarly, when channel estimation and directivity control are performed at the transmitting end, a complicated calculation on the transmitting end such as channel estimation or singular value decomposition may cause processing delay, which result in deterioration of error rate characteristic when directivity control is performed than in normal SDM.

Patent Document 1: Japanese Patent Application Laid-Open No. 2003-258770
Patent Document 2: Japanese Patent Application Laid-Open No. 2001-505723

DISCLOSURE OF THE INVENTION

Problems to be Solved by the Invention

As described above, with a conventional apparatus, there is a problem that, determinations for performing SDM communication with directivity control are not correct, resulting in decreased transmission efficiency.

It is therefore an object of the present invention to provide a transmitting/receiving apparatus and transmitting/receiving method that make correct determinations for performing SDM communication with directivity control and improve transmission efficiency.

Means for Solving the Problem

A transmitting/receiving apparatus of the present invention employs a configuration comprising: a channel estimation section that performs channel estimation for a known symbol of a received signal, a storage section that stores the channel estimation value estimated at the channel estimation section, a channel correlation section that determines a correlation between a channel estimation value of a known symbol of a received signal received earlier and stored in the storage section and the channel estimation value of the known symbol of the currently received signal, a determination section that determines whether or not the correlation is a value enabling space division multiplexing communication with directivity control by a communicating party, a weight generating section that generates a transmitting weight from the channel estimation result, and a transmitting section that, when the determination section determines that space division multiplexing communication with directivity control is possible, transmits the transmitting weight generated by the transmitting weight generating section to the communicating party, and, when the determination section determines that space division multiplexing communication with directivity control is not possible, instructs the communicating party to perform space division multiplexing communication without directivity control.

In addition, the transmitting/receiving apparatus of the present invention employs a configuration comprising: a channel estimation section that performs channel estimation for a known symbol of a received signal, a storage section that stores the channel estimation value estimated at the channel estimation section, a channel correlation section that determines a correlation between a known symbol of a received signal received earlier and stored in the storage section and a known symbol of a currently received signal, a determination section that determines whether or not the correlation is a value enabling space division multiplexing communication with directivity control by a communicating party, a weight generating section that generates a transmitting weight from the channel estimation result, a multiplying section that multiplies a transmission signal by the transmitting weight generated at the weight generating section, a transmitting section that transmits the signal multiplied by the transmitting weight at the multiplying section, and a switching section that, when the determination section determines that space division multiplexing communication with directivity control is possible, outputs the transmitting weight generated by the weight generating section to the multiplying section, and, when the determination section determines that space division multiplexing communication with directivity control is not possible, outputs "1" as the transmitting weight to the multiplying section.

In addition, the transmitting/receiving apparatus of the present invention employs a configuration comprising: a receiving section that receives one of a transmitting weight and a signal including an instruction to perform space division multiplexing communication without directivity control, a multiplying section that multiplies a transmission signal by the transmitting weight, a transmitting section that transmits the transmission signal multiplied by the transmitting weight at the multiplying section and a switching section that, when the receiving section receives the transmitting weight, outputs the received transmitting weight to the multiplying section, and, when the receiving section receives a signal including an instruction to perform space division multiplexing communication without directivity control, outputs "1" as the transmitting weight to the multiplying section.

A transmitting/receiving method comprising: at the transmitting/receiving apparatus: performing channel estimation for a received known symbol, determining a correlation between a channel estimation value of a known symbol received earlier and a channel estimation value of the known symbol currently received, determining whether or not the correlation is a value enabling space division multiplexing communication with directivity control by a communicating party, generating a transmitting weight from the channel estimation result, transmitting the generated transmitting weight to the communicating party when the determination is that space division multiplexing communication with directivity control is possible, and, transmitting a signal including an instruction to perform space division multiplexing communication without directivity control to said communicating party when the determination is that space division multiplexing communication with directivity control is not possible; and, at the communicating party: receiving one of the transmitting weight and a signal including an instruction to perform space division multiplexing communication without directivity control transmitted from the transmitting/receiving apparatus, multiplying a transmission signal by the received transmitting weight when the transmitting weight is received, multiplying the transmission signal by "1" as the transmitting weight when the signal including an instruction to perform space division multiplexing communication without directivity control is received, and transmitting the transmission signal multiplied the transmitting weight to the transmitting/receiving apparatus.

In addition, the transmitting/receiving method of the present invention comprising: performing channel estimation for a received known symbol, determining a correlation between a known symbol received earlier and a known symbol currently received, determining whether or not the correlation is a value enabling space division multiplexing communication with directivity control by a communicating party, generating a transmitting weight from the channel estimation result, multiplying the transmission signal by the generated transmitting weight when the determination is that space division multiplexing communication with directivity control is possible, and multiplying the transmission signal by "1" as transmitting weight when the determination is that space division multiplexing communication with control directivity is not possible, and transmitting the transmission signal multiplied the transmitting weight.

Advantageous Effect of the Invention

As described above, with the transmitting/receiving apparatus and the transmitting/receiving method of the present invention, whether or not channel fluctuation is in a range enabling SDM communication with directivity control is determined from the degree of correlation between channels of known symbols received at different timings, so that correct determinations are made for performing SDM communication with directivity control and transmission efficiency can be improved.

BEST MODE FOR CARRYING OUT THE INVENTION

Embodiments of the present invention will be explained below referring to the accompanying drawings.

Embodiment 1

Figure 4:
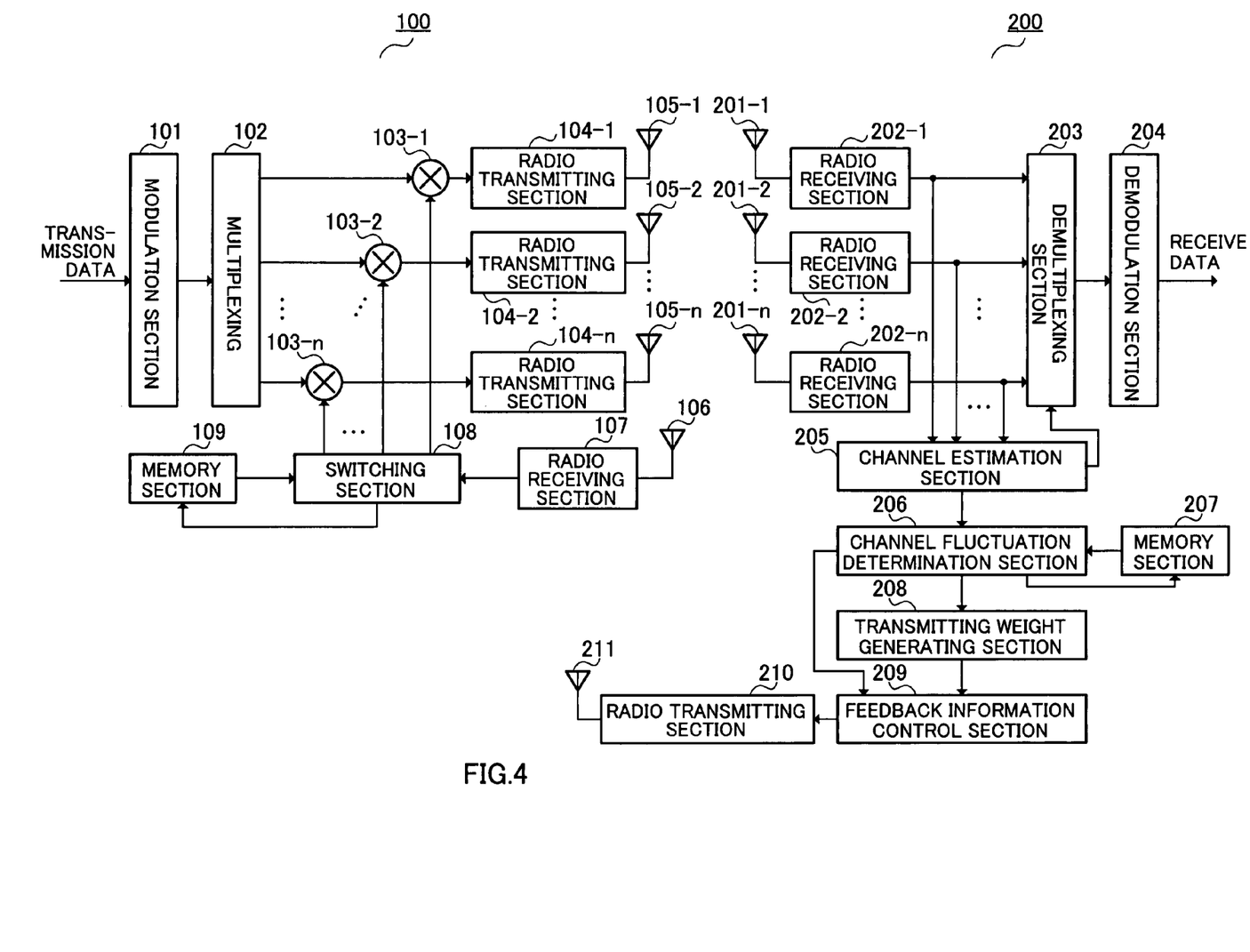
FIG. 4 is a block diagram showing the configuration of the transmitting/receiving apparatus according to Embodiment 1 of the present invention.

FIG. 4 is a block diagram showing a configuration of a transmitting/receiving apparatus according to Embodiment 1 of the present invention. Transmitting/receiving apparatus 100 shown in FIG. 4 is mainly comprised of modulating section 101, multiplexing section 102, multiplying sections 103-1 to 103-n, radio transmitting sections 104-1 to 104-n, antennas 105-1 to 105-n, antenna 106, radio receiving section 107, switching section 108 and memory section 109.

In addition, transmitting/receiving apparatus 200 communicating with transmitting/receiving apparatus 100 is mainly comprised of antennas 201-1 to 201-n, radio receiving sections 202-1 to 202-n, demultiplexing section 203, demodulating section 204, channel estimating section 205, channel fluctuation determination section 206, memory section 207, transmitting weight generating section 208, feedback information control section 209, radio transmitting section 210 and antenna 211.

In FIG. 4, modulating section 101 modulates transmission data and outputs the data to multiplexing section 102. Multiplexing section 102 divides the transmission data for antennas and outputs the data to multiplying sections 103-1 to 103-n corresponding to the antennas. Multiplying sections 103-1 to 103-n each multiply the transmission data by a transmitting weight output from switching section 108 and output the multiplied transmission data to radio transmitting sections 104-1 to 104-n. Radio transmitting sections 104-1 to 104-n convert the transmission data to radio frequency and transmits radio signals through antennas 105-1 to 105-n.

Radio receiving section 107 receives the radio signals transmitted from transmitting/receiving apparatus 200 via antenna 106, converts, demodulates and decodes the radio signals to baseband frequency, extracts the transmitting weights, instruction to perform SDM communication with directivity control, instruction to perform SDM communication without performing directivity or information indicating that there is no channel fluctuation, from the demodulated signals, and outputs these to switching section 108.

Switching section 108 outputs the transmitting weight s to memory section 109. Also, when radio receiving section 107 receives transmitting weights, switching section 108 outputs the transmitting weights to multiplying sections 103-1 to 103-n. Further, when radio receiving section 107 receives a signal including an instruction to perform SDM communication without performing directivity control, switching section 108 outputs "1" indicating that directivity control is not performed, to multiplying sections 103-1 to 103-n as a transmitting weight. In addition, when radio receiving section 107 receives a signal including information indicating that there is no channel fluctuation, switching section 108 extracts transmitting weights stored in memory section 109 and outputs the transmitting weights to multiplying sections 103-1 to 103-n. Memory section 109 stores the transmitting weights.

Next, the configuration of transmitting/receiving apparatus 200 will be described. In FIG. 4, radio receiving sections 202-1 to 202-n convert signals received via antennas 201-1 to 201-n from radio frequency to baseband frequency, and output converted signals to demultiplexing section 203 and channel estimation section 205. Demultiplexing section 203 collects the signals output from radio receiving sections 202-1 to 202-n into a single data stream using the channel estimation result in channel estimation section 205 and outputs the single data stream to demodulating section 204. Demodulating section 204 removes interference components from the received signals, divides the signals separately and obtains the received data.

Channel estimation section 205 performs channel estimation using a known symbol included in the received signals and outputs the channel estimation result to demultiplexing section 203 and channel fluctuation determination section 206.

Channel fluctuation determination section 206 determines the correlation value between the channel estimation result estimated in a one time earlier processing stored in memory section 207 and the channel estimation result currently estimated, and obtains the degree of channel fluctuation. Then, channel fluctuation determination section 206 determines whether to perform SDM communication with directivity control or to perform SDM communication without performing directivity control from the degree of channel fluctuation, and outputs the determination result to transmitting weight generating section 208 and feedback information control section 209. Also, channel fluctuation determination section 206 outputs the channel estimation result to memory section 207 and transmitting weight generating section 208.

Figure 5:
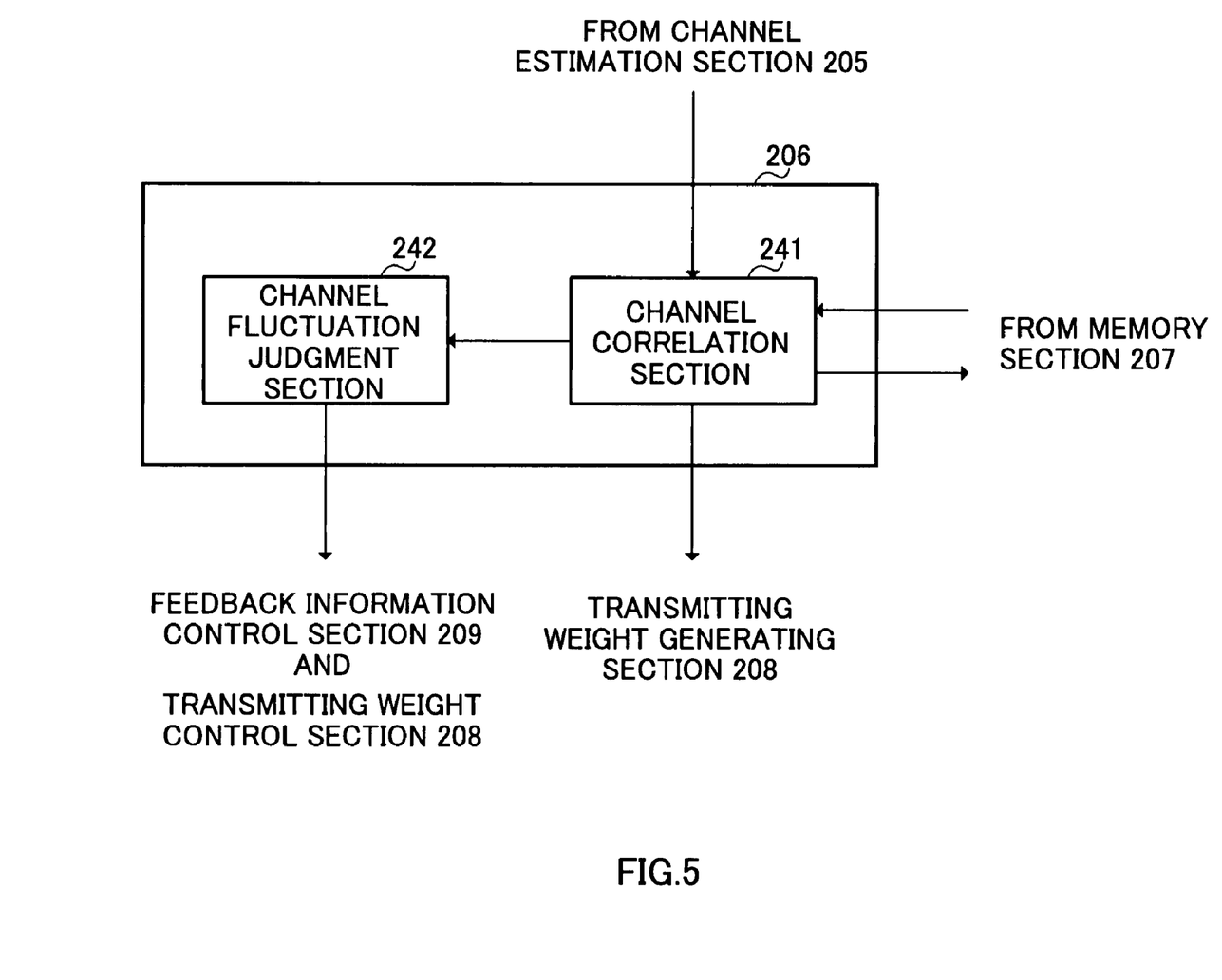
FIG. 5 is a block diagram showing the configuration of channel fluctuation determination section of the transmitting/receiving apparatus according to Embodiment 1 of the present invention.

Channel fluctuation determination section 206 is formed in the configuration shown in FIG. 5. FIG. 5 is a block diagram showing the configuration of channel fluctuation determination section 206 of the transmitting/receiving apparatus according to Embodiment 1 of the present invention. In FIG. 5, channel fluctuation determination section 206 is mainly comprised of channel correlation section 241 and channel fluctuation judgment section 242.

In FIG. 5, channel correlation section 241 extracts the channel estimation result estimated in one time earlier processing from memory 207 and determines the correlation value between this channel estimation result estimated in one time earlier processing and the channel estimation result currently estimated, obtains the degree of channel fluctuation and outputs the channel fluctuation to memory section 207, transmitting weight generating section 208 and channel fluctuation judgment section 242.

Channel fluctuation judgment section 242 determines whether to perform SDM communication with directivity control or perform SDM communication without performing directivity control from the degree of channel fluctuation, and outputs the determination result to transmitting weight generating section 208 and feedback information control section 209. Memory section 207 stores the channel estimation result. In addition, when determining that there is no channel fluctuation, channel fluctuation judgment section 242 outputs the determination result that there is no channel fluctuation to transmitting weight generating section 208 and feedback information control section 209.

When channel fluctuation determination section 206 determines to perform SDM communication with directivity control, transmitting weight generating section 208 generates transmitting weights from the channel estimation result and outputs the generated transmitting weights to feedback information control section 209. When channel fluctuation determination section 206 determines to perform SDM communication without performing directivity control or determines that there is no channel fluctuation, transmitting weight generating section 208 does not generate transmitting weights.

Feedback information control section 209 selects the transmitting weights, instruction to perform SDM communication with directivity control, instruction to perform SDM communication without performing directivity control or information indicating that there is no channel fluctuation based on the determination result of channel fluctuation determination section 206 and outputs these to radio transmitting section 210. Radio transmitting section 210 modulates the information output from feedback information control section 209, converts the information to radio frequency and transmits a radio signal via antenna 211.

Figure 6:
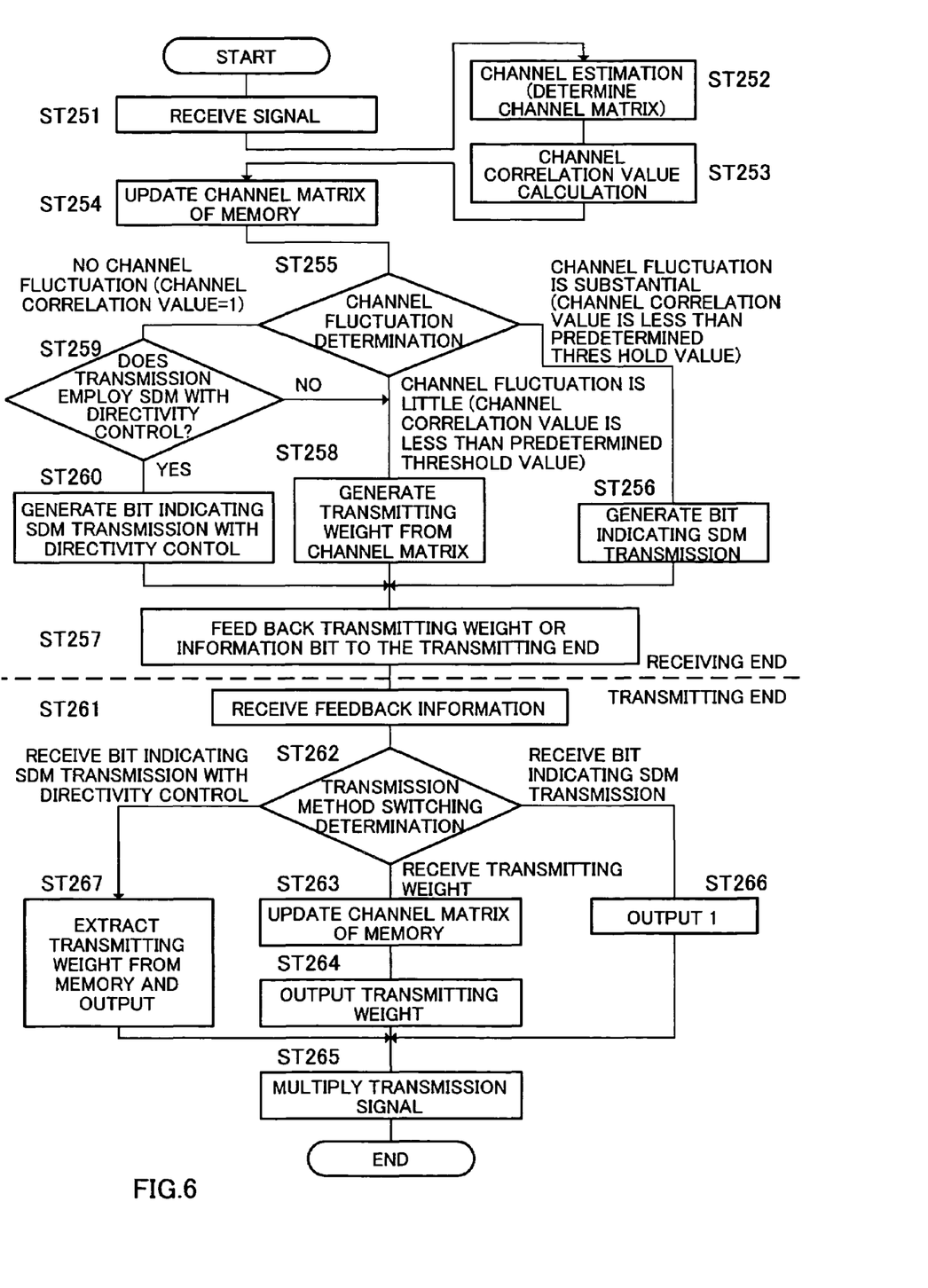
FIG. 6 is a flow chart showing the operation of the transmitting/receiving apparatus according to Embodiment of the present invention.

Next, the operation of the transmitting/receiving apparatus according to the Embodiment will be explained. FIG. 6 is a flow chart showing the operation of the transmitting/receiving apparatus according to this embodiment.

In ST251 of FIG. 6, after transmitting/receiving apparatus 200 receives signals via antennas 201-1 to 201-n, in ST 252, channel estimation section 205 performs channel estimation using known symbols of the signals. To be more specific, a channel response matrix is determined. Demultiplexing section 203 divides the multiplexed signals using this channel matrix.

In ST253, the channel matrix is transmitted to channel fluctuation determination section 206, and channel correlation values are compared between this channel matrix and the one time earlier channel matrix stored in memory section 207. Here, "one time earlier" is, for example, to perform the processing cycle of channel estimation one time earlier.

Here, assuming that the different channel matrices are A and B and elements of the matrices are $a_{ij}$ and $b_{ij}$, channel correlation value ρ of these two matrices A and B is calculated as the following equation (1).

(Equation 1)

$$\rho = \frac{E[a_{ij}^* \cdot b_{ij}]}{\sqrt{E[|a_{ij}|^2]} \sqrt{E[|b_{ij}|^2]}} \quad (1)$$

In ST254, content of memory section 207 is updated. Then, inST255, whether to perform SDM communication with directivity control or to perform SDM communication without performing directive control is determined from the degree of channel fluctuation according to the correlation value determined by equation (1), and information to be transmitted to transmitting/receiving apparatus 100 is selected.

When the channel correlation value is equal to or greater than a predetermined threshold value, determination is made for obtaining directivity control effect in transmitting/receiving apparatus 100, and the processing proceeds to ST256, and channel fluctuation determination section 206 transmits the channel matrix to transmitting weight generating section 208. Then, in ST257, the transmitting weight is fed back from feedback information control section 209 to transmitting/receiving apparatus 100.

Also, when the channel correlation value is less than a predetermined threshold value, determination is made for not obtaining directivity control effect since channel fluctuation is substantial at present, and the processing proceeds to ST258, and channel fluctuation determination section 206 transmits a bit indicating normal SDM transmission without performing directivity control, to feedback information control section 209. After that, this bit is fed back from feedback information control section 209 to transmitting/receiving apparatus 100.

In addition, when the channel correlation value is 1—in other words, when there in no channel fluctuation at all in channel observations performed twice—the processing proceeds to ST259. Then, when a bit indicating that SDM transmission is performed by directivity control is received from transmitting/receiving apparatus 100, the processing proceeds to ST260, and channel fluctuation determination section 206 transmits a bit indicating that there is no channel fluctuation, to feedback information control section 209. Then, in ST257, the bit is fed back to transmitting/receiving apparatus 100 from feedback information control section 209.

On the other hand, when the bit indicating that normal SDM transmission is performed, is received from the transmitting end, channel that has fluctuated largely stop fluctuating so that channel fluctuation determination section 206 determines that SDM transmission by directivity control is possible, and the processing proceeds to ST258, the channel matrix is transmitted to transmitting weight generating section 208, and the generated transmitting weights are transmitted to feedback information control section 209. In ST257, the transmitting weights are fed back to transmitting/receiving apparatus 100.

Next, the operation of transmitting/receiving apparatus 100 is described. Transmitting/receiving apparatus 100 receives the feedback information transmitted from transmitting/receiving apparatus 200 in ST261, and performs switching determination of transmitting method in ST262. When transmitting weights are fed back from transmitting/receiving apparatus 200, switching section 108 determines that SDM transmission by directivity control is newly performed, and the processing proceeds to ST263. Memory section 109, when transmitting weights are fed back, updates the stored weights and prepares for next feedback information. Then, in ST264, switching section 108 outputs the received transmitting weights, and, in ST265, multiplying sections 103-1 to 103-n assign weight to the modulated signals using these transmitting weights and transmit the signals. At this point, a bit indicating that SDM transmission by directivity control is performed, is added.

This addition enables transmitting/receiving apparatus 200 to determine that the transmission is performed by directivity control, and it is readily to perform demultiplexing by multiplying a received signal weights.

In addition, when the bit instructing SDM transmission is fed back from transmitting/receiving apparatus 200, the processing proceeds to ST266, and switching section 108 determines that normal SDM transmission is performed, makes all transmitting weights "1", assigns the transmitting weights to the modulated signals and transmits the signals. Now, normal SDM transmission can be performed without directivity control since the transmitting weights are "1". At this point, a bit indicating that normal SDM transmission is performed upon transmission is added. By this means, transmitting/receiving apparatus 200 can determine that normal SDM transmission was performed and perform demultiplexing calculation.

When a bit indicating that there is no channel fluctuation is fed back from transmitting/receiving apparatus 200, the processing proceeds to ST267, switching section 108 determines to perform directivity control using the transmitting weights used one time earlier, extracts the transmitting weights stored in memory section 109, weights the modulated signals using these transmitting weights and transmits them. At this point, a bit indicating that SDM transmission by directivity control is performed, is added.

This addition enables transmitting/receiving apparatus 200 to determine that the transmission is performed by directivity control, and it is readily to perform demultiplexing by multiplying a received signal weights. In addition, the memory section, when transmitting weights are fed back, updates the stored weights and prepare for next feedback information.

As described above, with the transmitting/receiving apparatus of the present embodiment, whether or not channel fluctuation is in a range enabling SDM communication with directivity control is determined from the degree of correlation between channels of known symbols received at different timings, so that correct determinations are made for performing SDM communication with directivity control and transmission efficiency can be improved.

In addition, with the transmitting/receiving apparatus of the present invention, transmitting weights are not transmitted in a situation where propagation path environment does not change, so that it is possible to reduce the amount of transmission for control information.

In addition, with the transmitting/receiving apparatus of the present invention, the same transmitting weight s can be continuously used in a situation where there is little channel fluctuation, so that it is not necessary to transmit transmitting weights of similar values many times, and the amount of transmission for control channel can be reduced.

Embodiment 2

Figure 7:
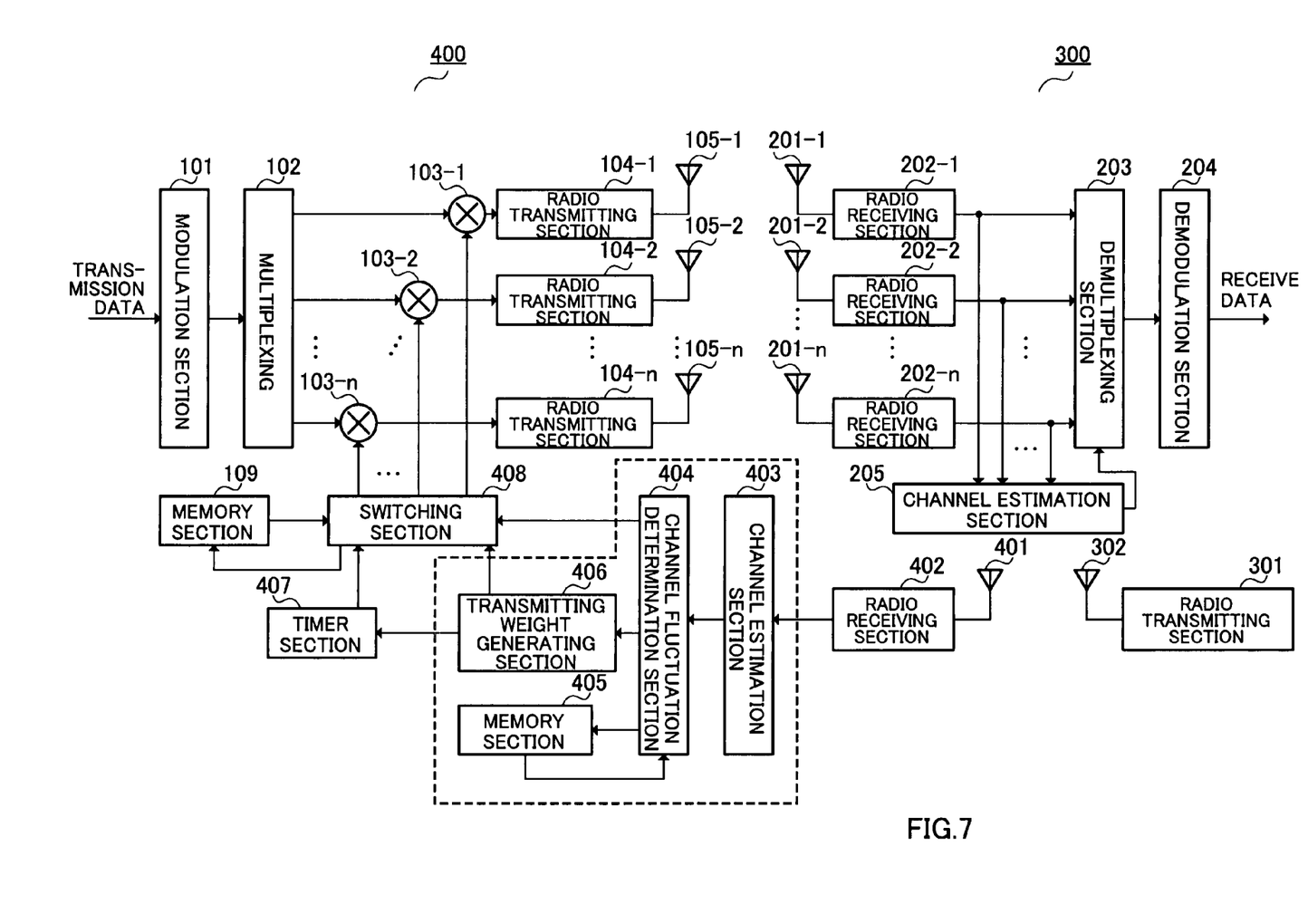
FIG. 7 is a block diagram showing the configuration of transmitting/receiving apparatus according to Embodiment 2 of the present invention.

FIG. 7 is a block diagram showing a configuration of a transmitting/receiving apparatus according to Embodiment 2 of the present invention. Note that the same configurations as those of FIG. 4 are assigned the same reference numerals as in FIG. 4 and detailed explanations thereof are omitted.

Transmitting/receiving apparatus 300 of FIG. 7 is comprised of radio transmitting section 301 and antenna 302, and is different from the transmitting/receiving apparatus 200 of FIG. 4 in that transmitting/receiving apparatus 300 transmits radio signals including a known symbol. In addition, the transmitting/receiving apparatus 400 of FIG. 7 is comprised of antenna 401, radio receiving section 402, channel estimating section 403, channel fluctuation determination section 404, memory section 405, transmitting weight generating section 406, timer section 407 and switching section 408, and is different from transmitting/receiving apparatus 100 of FIG. 4 in that transmitting/receiving apparatus 400 determines whether or not to perform directivity control at the transmitting end using SDM scheme.

In FIG. 7, radio transmitting section 301 transmits radio signals including a known symbols via antenna 302.

Radio receiving section 402 receives the radio signals transmitted from transmitting/receiving apparatus 300 via antenna 401, extracts the known symbol by converting, demodulating and decoding the received signal into baseband frequency and outputs it to channel estimation section 403.

Channel estimation section 403 performs channel estimation using the known symbol included in the received signals and outputs the channel estimation result to channel fluctuation determination section 404.

Channel fluctuation determination section 404 determines the correlation value between the channel estimation result estimated in the one time earlier processing stored in memory section 405 and the channel estimation result currently estimated and obtains the degree of channel fluctuation. Then, channel fluctuation determination section 404 determines whether to perform SDM communication with directivity control or to perform SDM communication without performing directivity control from the degree of channel fluctuation, and outputs the determination result to transmitting weight generating section 406 and switching section 408. Also, channel fluctuation determination section 404 outputs the channel estimation result to memory section 405 and transmitting generating section 406.

In addition, when channel fluctuation determination section 404 determines that there is no channel fluctuation, outputs the determination result that there is no channel fluctuation to transmitting weight generating section 406 and switching section 408. Memory section 405 stores the channel estimation result.

Channel fluctuation determination section 404 determines to perform SDM communication with directivity control, transmitting weight generating section 406 generates transmitting weights from the channel estimation result and outputs the transmitting weights to switching section 408.

In addition, channel fluctuation determination section 404 determines to perform SDM communication without performing directivity control, or there is no channel fluctuation, transmitting weight generating section 406 does not generate transmitting weights.

Switching section 408 outputs the transmitting weights to memory section 109. In addition, when channel fluctuation determination section 404 determines to perform SDM communication with directivity control and does not output information indicating that there is no channel fluctuation, switching section 408 outputs the transmitting weights generated by transmitting weight generating section 406 to multiplying sections 103-1 to 103-n. In addition, when channel fluctuation determination section 404 determines to perform SDM communication without performing directivity control, switching section 408 makes "1" indicating that directivity control is not performed as transmitting weights and outputs the transmitting weights to multiplying sections 103-1 to 103-n. Further, when channel fluctuation determination section 404 determines to perform SDM communication with directivity control and outputs information indicating that there is no channel fluctuation, switching section 408 extracts the transmitting weights stored in memory section 109 and outputs the transmitting weights to multiplying sections 103-1 to 103-n. Memory section 109 stores the transmitting weights. The determination operation and instruction of channel fluctuation determination section 404 and switching section 408 is the same as those in Embodiment 1.

Timer section 407 measures time for generating a transmitting weight by transmitting weight generating section 406 and outputs the measurement result to switching section 408. Switching section 408, when the time for generating transmitting weights by transmitting weight generating section 406 is equal to or greater than a predetermined time to generate a transmitting weight, determines that SMD communication with directivity control is not possible, and outputs "1" indicating that directivity control is not performed as transmitting weights to multiplying sections 103-1 to 103-n.

Figure 8:
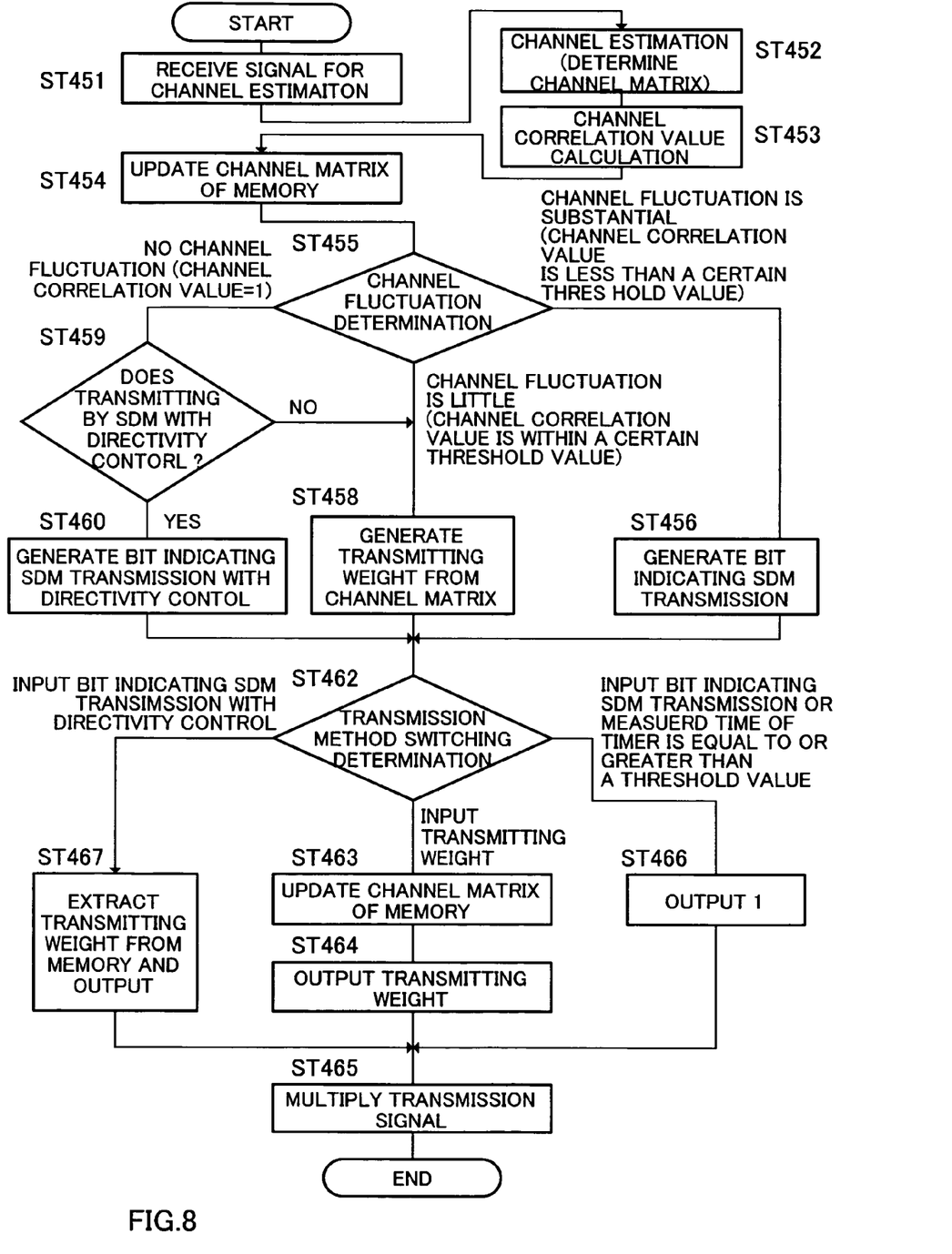
FIG. 8 is a flow chart showing the operation of the transmitting/receiving apparatus according to Embodiment of the present invention.

Next, an operation of the transmitting/receiving apparatus according to this embodiment will be explained. FIG. 8 is a flow chart showing the operation of the transmitting/receiving apparatus according to this embodiment.

In FIG. 8, in ST451, after transmitting/receiving apparatus 400 receives signals via antenna 401, and then in ST452, channel estimation section 403 performs channel estimation using a known symbol of the signals. To be more specific, channel estimation section 403 finds a channel response matrix.

In addition, in ST453, the channel matrix is transmitted to channel fluctuation determination section 404, and channel correlation value is compared with the channel matrix of one time earlier stored in memory section 405. Here, "one time earlier" is, for example, to perform the processing cycle of channel estimation one time earlier.

In ST 454, the content of memory section 405 is updated. Then, in ST455, whether to perform to perform SDM communication with directivity control or to perform SDM communication without performing directivity control is determined from the degree of channel fluctuation according to the correlation value obtained by equation (1).

When channel correlation value is equal to or greater than a predetermined threshold value, directivity control effect is determined to be obtained in transmitting/receiving apparatus 400, and the processing proceeds to ST 456, and channel fluctuation determination section 404 transmits the channel matrix to transmitting weight generating section 406.

Further, when channel correlation value is less than a predetermined threshold value, determination is made for not obtaining directivity control effect since channel fluctuation is great at present, the processing proceeds to ST458, channel fluctuation determination section 404 transmits a bit indicating normal SDM transmission without performing directivity control to switching section 408.

In addition, when channel correlation value is 1—in other words, when there is no channel fluctuation in channel observations performed twice—the processing proceeds to ST 459. Then, when SDM transmission with directivity control is performed, the processing proceeds to ST460, and channel fluctuation determination section 404 transmits a bit indicating that there is no channel fluctuation to switching section 408.

On the other hand, when normal SDM transmission is performed, the channel that has been fluctuating largely stops fluctuating so that channel fluctuation determination section 04 determines that SDM transmission with directivity control is possible, the processing proceeds to ST458, channel fluctuation determination section 404 transmits the channel matrix to transmitting weight generating section 406 and the generated weight to switching section 408.

In ST462, switching determination of the transmitting method is performed. When the transmitting weights are fed back from transmitting/receiving method 400, switching section 408 determines to newly perform SDM transmission with directivity control, and the processing proceeds to ST 463. Memory section 109, when transmitting weights are generated, updates the stored transmitting weight and prepares for next transmission.

Then, in ST464, switching section 408 outputs the generated transmitting weights, and in ST465, multiplying sections 103-1 to 10 -n assign weight to the modulated signals using these transmitting weights and transmits them.

In addition, when SDM transmission is performed in transmitting/receiving apparatus 400, the processing proceeds to ST466, and switching section 408 determines to perform normal SDM, makes all transmitting weights "1", assigns these transmitting weights to the modulated signal and transmits them. Now, since transmitting weights are 1, normal SDM transmission can be performed without performing directivity control.

Then, when it is determined that there is no channel fluctuation in transmitting/receiving apparatus 400, the processing proceeds to ST467, and switching section 408 determines to perform directivity control using the transmitting weights used one time earlier, extracts the transmitting weights stored in memory section 109, assigns weight to the modulated signals using this transmitting weights and transmits them. In addition, when the transmitting weights are fed back, memory section 109 updates the stored weights and prepares for next feedback information.

As described above, with the transmitting/receiving apparatus and the transmitting/receiving method of this embodiment, whether or not channel fluctuation is in a range enabling SDM communication with directivity control is determined from the degree of correlation between channels of known symbols received at different timings, so that it is possible to correctly determine to perform SDM communication with directivity control and improve transmission efficiency.

In addition, with the transmitting/receiving apparatus of this embodiment, when the time after channel estimation until transmitting weight s are generated exceeds a predetermined time, SDM communication without directivity control is performed without using the generated transmitting weights, so that it is possible to prevent deterioration of transmission efficiency of SDM communication with directivity control caused by differences between the propagation path environment upon transmission and the propagation path environment upon channel estimation.

In addition, with the transmitting/receiving apparatus of this embodiment, transmitting weights are generated only when SDM communication with directivity control is performed, so that it is possible to save calculation resources for generating transmitting weights in SDM communication without directivity control.

Embodiment 3

Figure 9:
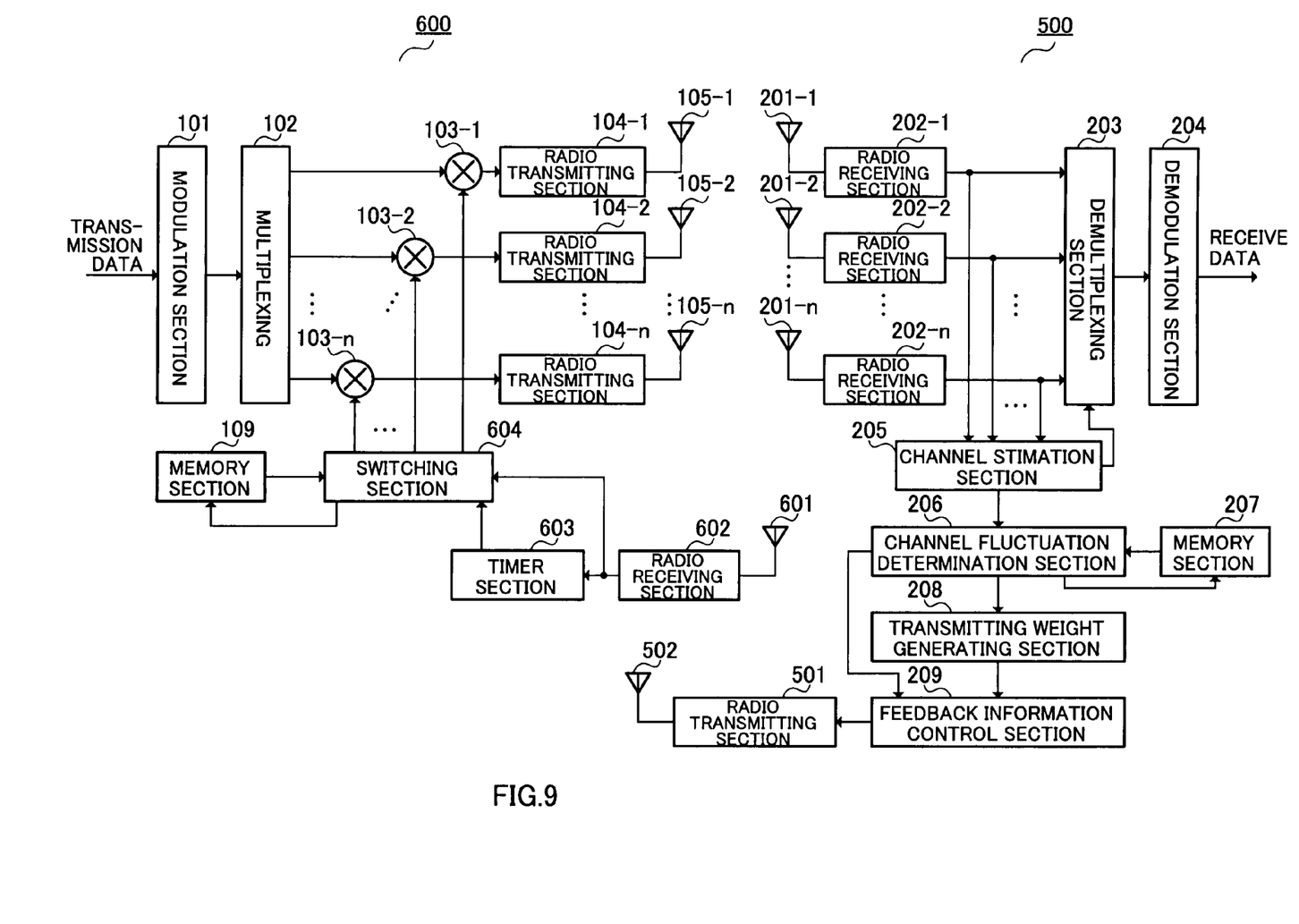
FIG. 9 is a block diagram showing the configuration of the transmitting/receiving apparatus according to Embodiment 3 of the present invention.

FIG. 9 is a block diagram showing a configuration of a transmitting/receiving apparatus according to Embodiment 3 of the present invention. Note that the same configurations as those in FIG. 4 are attached same numerals as FIG. 4, and detailed explanations thereof are omitted. Transmitting/receiving apparatus 500 of FIG. 9 is comprised of radio transmitting section 501 and antenna 502, and is different from transmitting/receiving apparatus 200 of FIG. 4 in that transmitting/receiving apparatus 500 transmits timing information at the beginning of generating transmitting weights. In addition, transmitting/receiving apparatus 600 of FIG. 9 is mainly comprised of antenna 601, radio receiving section 602, timer section 603 and switching section 604.

In FIG. 9, radio transmitting section 501 transmits timing information of the beginning and ending of generating transmitting weights as radio signals via antenna 502.

Radio receiving section 602 receives the radio signals transmitted from transmitting/receiving apparatus 500 via antenna 601, converts, demodulates and decodes on the radio signals into baseband frequency, extracts the transmitting weights, instruction to perform SDM communication with directivity control, instruction to perform SDM communication without performing directivity control or information indicating that there is no channel fluctuation from the demodulated signals, outputs them to switching section 604, extracts timing information of the beginning and ending of generating transmitting weights and outputs it to timer section 603.

Switching section 604 outputs the transmitting weights to memory section 109. In addition, when radio receiving section 602 receives the transmitting weights, switching section 604 outputs the transmitting weights to multiplying sections 103-1 to 103-n. Then, radio receiving section 602 receives signals including instruction to perform SDM communication without performing directivity control, switching section 604 outputs "1" indicating that directivity control is not performed as the transmitting weights to multiplying sections 103-1 to 103-n. In addition, when radio receiving section 602 receives signals including information that there is no channel fluctuation, switching section 604 extracts the transmitting weights stored in memory section 109 and outputs it to multiplying sections 103-1 to 103-n. Memory section 109 stores the transmitting weights.

Timer section 603 measures time for generating transmitting weights by transmitting weight generating section 208 from timing information of the beginning and ending of generating transmitting weights, and outputs the measurement result to switching section 604. When the time for generating transmitting weights by transmitting weight generating section 208 is equal to or greater than a predetermined time, switching section 604 determines that SDM communication with directivity control is not possible and transmits 1 indicating that directivity control is not performed as transmitting weights to multiplying sections 103-1 to 103-n.

As described above, with the transmitting/receiving apparatus of this embodiment, in addition to the effect of the above Embodiment 1, when the time after channel estimation until transmitting weights are generated exceeds a predetermined time, SDM communication without directivity control is performed without using the generated transmitting weights, so that it is possible to prevent deterioration of transmission efficiency of SDM communication with directivity control caused by the differences between the propagation path environment upon transmission and the propagation path environment upon channel estimation.

The present invention is not limited to the above embodiments and can be implemented in various modifications. For example, although cases have been described with the above embodiments where the present invention is implemented as a transmitting/receiving apparatus, the present invention is by no means limited to this, and it is equally possible to implement this transmitting/receiving method as software.

For example, a program that executes the above transmitting/receiving method may be stored in a ROM (Read Only Memory) in advance, so that the program may be operated by a CPU (Central Processor Unit).

In addition, a program that executes the above transmitting/receiving method may be stored in a computer-readable storage medium and the program stored in the storage medium may be recorded in a RAM of a computer RAM (Random Access Memory), so that the computer may be operated in accordance with the program.

The present application is based on Japanese Patent Application No. 2004-24321 filed on Jan. 30,2004, the entire content of which is expressly incorporated herein by reference.

INDUSTRIAL APPLICABILITY

The transmitting/receiving apparatus of the present invention is suitable for use for communication terminal apparatus, base station apparatus and so forth.

The invention claimed is:

1. A transmitting/receiving apparatus comprising:
a channel estimation section that performs channel estimation for a known symbol of a received signal;
a storage section that stores a channel estimation value estimated at said channel estimation section;
a determination section that determines a correlation between a known symbol of a received signal received earlier and stored in said storage section and a known symbol of a currently received signal and determines whether or not the correlation is a value enabling space division multiplexing communication with directivity control by a communicating party;
a weight generating section that generates a transmitting weight from a result of the channel estimation;
a multiplying section that multiplies a transmission signal by the transmitting weight generated at said weight generating section;
a transmitting section that transmits the signal multiplied by the transmitting weight at said multiplying section;
a timer section that measures a time, when said weight generating section takes to generate the transmitting weight; and
a switching section that, when said determination section determines that space division multiplexing communication with directivity control is possible and when the time for generating the transmitting weight, which is measured by said timer section, is less than a predetermined time, outputs the transmitting weight generated by said weight generating section to said multiplying section, and, when said determination section determines that space division multiplexing communication with directivity control is not possible and when the time for generating the transmitting weight, which is measured by said timer section, is equal to or greater than the predetermined time, outputs "1" as the transmitting weight to said multiplying section.

2. A transmitting/receiving apparatus comprising:
a receiving section that receives one of a transmitting weight and a signal including an instruction to perform space division multiplexing communication without directivity control;
a multiplying section that multiplies a transmission signal by the transmitting weight;
a transmitting section that transmits the transmission signal multiplied by the transmitting weight at said multiplying section;
a timer section that measures a receiving time for the transmitting weight; and
a switching section that, when said receiving section receives the transmitting weight and when the receiving time for the transmitting weight, which is measured by said timer section, is less than a predetermined time, outputs the received transmitting weight to said multiplying section, and, when said receiving section receives the signal including the instruction to perform space division multiplexing communication without directivity control and when the receiving time is equal to or greater than the predetermined time, outputs "1" as the transmitting weight to said multiplying section.

3. The transmitting/receiving apparatus according to claim 2, further comprising a storage section that stores a transmitting weight received earlier at said receiving section, wherein:
said receiving section receives one of the transmitting weight, the signal including an instruction to perform space division multiplexing communication without directivity control and a signal indicating that there is no channel fluctuation; and
when said receiving section receives the transmitting weight and when the receiving time for the transmitting weight, which is measured by said timer section, is less than the predetermined time, said switching section outputs the received transmitting weight to said storage section and said multiplying section, and, when said receiving section receives the signal indicating that there is no channel fluctuation, outputs the transmitting weight stored in said storage section to said multiplying section.

4. A transmitting/receiving method comprising the steps of:
at a first transmitting/receiving apparatus, performing channel estimation for a received known symbol;
at the first transmitting/receiving apparatus, determining a correlation between a channel estimation value of a known symbol received earlier and a channel estimation value of a known symbol currently received, and determining whether or not the correlation is a value enabling space division multiplexing communication with directivity control by a communicating party;
at the first transmitting/receiving apparatus, generating a transmitting weight from a result of the channel estimation;
at the first transmitting/receiving apparatus, transmitting the generated transmitting weight to the communicating party when the determination is that space division multiplexing communication with directivity control is possible, and transmitting a signal including an instruction to perform space division multiplexing communication without directivity control to the communicating party, when the determination is that space division multiplexing communication with directivity control is not possible;
at a second transmitting/receiving apparatus comprising the communicating party, receiving one of the transmitting weight and the signal including the instruction to perform space division multiplexing communication without directivity control transmitted from the first transmitting/receiving apparatus;

at the second transmitting/receiving apparatus, measuring a receiving time for the transmitting weight;

at the second transmitting/receiving apparatus, multiplying a transmission signal by the received transmitting weight when the transmitting weight is received and when the receiving time for the transmitting weight is less than a predetermined time, and multiplying the transmission signal by "1" as the transmitting weight when the signal including the instruction to perform space division multiplexing communication without directivity control is received and when the receiving time for the transmitting weight is equal to or greater than the predetermined time; and at the second transmitting/receiving apparatus, transmitting the transmission signal multiplied by the transmitting weight to the first transmitting/receiving apparatus.

5. A transmitting/receiving method comprising the steps of:

performing channel estimation for a received known symbol;

determining a correlation between a known symbol received earlier and a known symbol currently received and determining whether or not the correlation is a value enabling space division multiplexing communication with directivity control by a communicating party;

generating a transmitting weight from a result of the channel estimation;

measuring a time for generating the transmitting weight;

multiplying a transmission signal by the generated transmitting weight, when the determination is that space division multiplexing communication with directivity control is possible and when the time for generating the transmitting weight is less than a predetermined time, and multiplying the transmission signal by "1" as the transmitting weight, when the determination is that space division multiplexing communication with control directivity is not possible and when the time for generating the transmitting weight is equal to or greater than the predetermined time; and transmitting the transmission signal multiplied by the transmitting weight.

* * * * *

UNITED STATES PATENT AND TRADEMARK OFFICE
CERTIFICATE OF CORRECTION

PATENT NO. : 7,668,510 B2
APPLICATION NO. : 10/587166
DATED : February 23, 2010
INVENTOR(S) : Tomohiro Imai et al.

It is certified that error appears in the above-identified patent and that said Letters Patent is hereby corrected as shown below:

Claim 1, column 13, line 51 reads:

"a timer section that measures a time, when said weight"

and should read

"a timer section that measures a time said weight"

Signed and Sealed this

Third Day of August, 2010

David J. Kappos
*Director of the United States Patent and Trademark Office*